United States Patent Office 2,923,741
Patented Feb. 2, 1960

2,923,741

FLUOROCARBON PHOSPHORUS RINGS

Anton B. Burg and Walter Mahler, Los Angeles, Calif., assignors, by mesne assignments, to American Potash & Chemical Corporation, a corporation of Delaware No Drawing. Application December 30, 1957
Serial No. 705,814

5 Claims. (Cl. 260—606.5)

This invention relates in general to the preparation of fluorocarbon phosphorus compounds through the thermal decomposition of fluorocarbon phosphines. More particularly, this invention relates to a method for the preparation of polymers of $PCF_3$ units through the thermal decomposition of such compounds as $P_2(CF_3)_4$ and $(CF_3)_2PH$.

It is an object of this invention to provide a method whereby certain basically inorganic polymers may be formed.

A further object of this invention is to provide a method whereby, through the thermal decomposition of certain precursors, compounds may be prepared which have a plurality of phosphorus atoms joined one to the next and fluorocarbon groups bonded to each of the phosphorus atoms.

Ancillary objects and advantages of this invention, if not specifically set forth, will become apparent during the course of the discussion which follows.

Generally, it has been found that on pyrolyzing the fluorocarbon phosphines at temperatures preferably in the neighborhood of 300°–350° C., stable compounds form which are phosphorus ring compounds having the general formula $(PCF_3)_x$.

More particularly, it has been found that the desired phosphorus ring compounds as set forth in our copending application Serial No. 705,831, filed even date herewith, may be formed by pyrolyzing compounds of the type $P_2(CF_3)_4$ and $(CF_3)_2PH$ at temperatures within the range 300–350° C. Higher temperatures encourage decomposition of the desired reaction products, while lower temperatures yield the products, but at reduced rates. Preferably, apparatus is employed permitting condensation of the desired "$PCF_3$" groups or newly formed polymers and their immediate removal from the high temperature zone. Decomposition of the product is thereby avoided.

The method of the aforementioned copending application wherein the $(CF_3P)_4$ and $(CF_3P)_5$ were analyzed by their reaction with iodine which quantitatively reverted the products to 4 or 5 moles of $CF_3PI_2$ was used to aid in identifying the products here. These in turn were converted directly to $HCF_3$ by alkaline hydrolysis. The direct alkaline hydrolysis of the $CF_3$ polymers delivered only half of the $CF_3$ groups as $HCF_3$ while the others were partly broken down. Such behavior is consistent with the results of alkaline hydrolysis of $(CF_3)_2PH$ and $P_2(CF_3)_4$. The vapor density of the tetramer was such as to give the molecular weight of 402, as compared with a calculated 400. In similar fashion the vapor density of the pentamer was determined and its molecular weight indication closely corresponded with that of the calculated, 495 as against the calculated 500.

Various examples are set forth below for illustrative purposes but are not to be construed as placing limitations on the scope of the invention other than as are set forth in the appended claims.

*Example 1*

In the pyrolysis of $P_2(CF_3)_4$ a 4 m. mole sample of $P_2(CF_3)_4$ was heated in one leg of a pyrolysis chamber. The products were removed from the reaction zone by means of a 0° condenser, 4 m. moles of $(CF_3)_3P$ were produced along with 0.33 m. mole of $(PCF_3)_4$, a 33% yield, and 0.05 m. mole of $(PCF_3)_5$, a 6% yield. The remainder consisted of higher $(PCF_3)_x$ polymers.

*Example 2*

In another experiment run in the fashion of that set forth but at a somewhat lesser temperature, 300° C., in the presence of borontrifluoride, the yield of $(PCF_3)_4$ was 50% of that demanded by the equation:

$$4P_2(CF_3)_4 \rightarrow 4P(CF_3)_3 + (PCF_3)_4$$

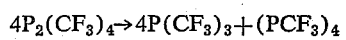

The borontrifluoride used here was probably ineffective as about 95% of it was recovered thereafter.

*Example 3*

The compound $(CF_3)_2PH$ was prepared by the reaction of $(CF_3)_2PI$ and $HCl$ with mercury to yield the desired component together with the usual $P_2(CF_3)_4$. The $(CF_3)_2PCl$ which formed as a by-product was removed by pure water hydrolysis. The pure $(CF_3)_2PH$ thus was finally obtained in a yield amounting to 35% of the original $(CF_3)_2PI$. This product was heated at a temperature of 350° C. for 70 hours, the apparatus employed incorporating a 0° C. condenser so as to remove the desired $(PCF_3)$ units prior to their decomposition in the reaction zone. The reaction thus proceeded according to the chemical equation.

$$x(CF_3)_2PH \rightarrow xHCF_3 + (PCF_3)_x$$

The polymers $(PCF_3)_4$ and $(PCF_3)_5$ were obtained and were next separated in accordance with the procedures set forth in the already mentioned copending application. Lesser amounts of higher polymers were present in the reaction mixture.

As set forth in our copending application Serial No. 705,831 for Fluorocarbon Phosphorus Rings, the products prepared according to the process of this invention find utility as antioxidants soluble in hydrocarbons. Further, they may be oxidized to polymeric materials of the general formula $(CF_3PO_2)_x$, the more volatile components of which may be driven off to leave a solid polymeric material which acts as an excellent water scavenger and yet is resistant to oxidation. Also, this material is stable at fairly high temperatures and hence finds particular utility in high temperature applications.

As set forth in the copending application above-mentioned, the $PCF_3$ polymers find other uses as incendiary igniters, and as additives for lubricants and hydraulic fluids for the prevention of damage due to the action of ionizing radiation.

Obviously many modifications and variations of this

We claim:

1. A process for preparing a chemical composition having the formula $(PCF_3)_x$ wherein $x$ is an integer greater than 3 and wherein the phosphorus atoms are arranged in a ring structure which comprises: pyrolyzing a fluorocarbon phosphine whereby to yield units of $CF_3P$ groups and allowing said $CF_3P$ groups to thereafter arrange themselves into ring structures corresponding to said formula $(PCF_3)_x$.

2. The process of claim 1, wherein the pyrolyzing temperatures are about 300° to 350° C.

3. The process of claim 1, wherein the fluorocarbon phosphine is $P_2(CF_3)_4$.

4. The process of claim 1, wherein the fluorocarbon phosphine is $(CF_3)_2PH$.

5. The process of claim 1, wherein the $CF_3P$ groups formed by pyrolysis are immediately thereafter condensed and removed from the heated reaction zone.

No references cited.